Figure 1:
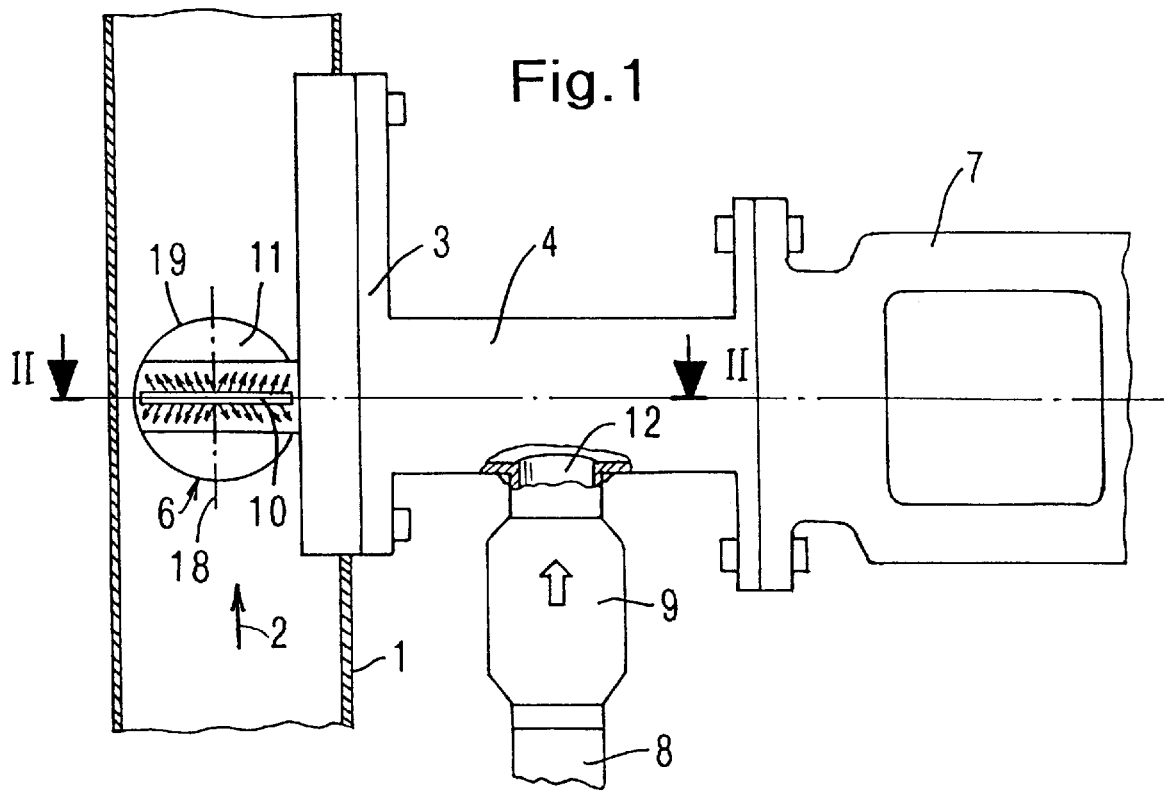

United States Patent
Knauer

[11] Patent Number: 5,993,670
[45] Date of Patent: Nov. 30, 1999

[54] APPARATUS FOR ADMIXING OF A FLOCCULANT LIQUID TO A SLUDGE STREAM AND USE OF THE APPARATUS

[76] Inventor: Joachim Friedrich Knauer, Deuil la Barrestr. 17 - 19, D-60437 Frankfurt, Germany

[21] Appl. No.: 08/947,969

[22] Filed: Oct. 8, 1997

[30] Foreign Application Priority Data

Oct. 9, 1996 [DE] Germany .......................... 196 41 537
May 9, 1997 [DE] Germany .......................... 197 19 638

[51] Int. Cl.$^6$ .................................................. C02F 11/14
[52] U.S. Cl. ................. 210/738; 210/136; 210/198.1; 210/206; 210/219; 366/169.2; 422/259
[58] Field of Search .................... 210/738, 198.1, 210/206, 208, 219, 220, 136; 366/167.2, 169.1, 169.2; 422/259

[56] References Cited

U.S. PATENT DOCUMENTS

| | | | |
|---|---|---|---|
| 2,274,361 | 2/1942 | Darby | 210/738 |
| 2,685,369 | 8/1954 | Crossley | 210/738 |
| 3,482,520 | 12/1969 | Larsen | 366/169.2 |
| 3,666,663 | 5/1972 | Walker | 210/206 |
| 4,055,494 | 10/1977 | Emmett, Jr. | 210/208 |
| 4,663,055 | 5/1987 | Ling et al. | 210/738 |
| 5,366,622 | 11/1994 | Geyer | 210/199 |

FOREIGN PATENT DOCUMENTS

| | | |
|---|---|---|
| 3901292 | 7/1990 | Germany . |
| 4029824 | 3/1992 | Germany . |

*Primary Examiner*—Peter A. Hruskoci
*Attorney, Agent, or Firm*—Brown & Wood, LLP

[57] ABSTRACT

There is provided an apparatus in which a distribution head 6 is arranged in a sludge pipe 1, through which a wastewater or sewage sludge stream 2 flows, is associated with a rotational plane 18 and includes flocculation liquid outlets (10) and mixing blades (11). It is desirable to provide for a better admixing of the flocculant liquid to the wastewater or sewage sludge. This is achieved by forming the flocculant liquid outlets 10 as slots and the mixing blades 11 as strips which extend transverse to the rotational plane 18 and have a length equal to at least half of the width of the sludge stream. The flocculant liquid exits from each slot as a broad strip into which a following blade extends and pulls along its outer edge the flocculant liquid in a form of a foggy strip through the wastewater or sewage sludge. The water content of the flocculant liquid should be such that maximum 3 parts of the flocculant liquid is admixed to 100 parts of the wastewater or sewage sludge.

22 Claims, 1 Drawing Sheet

U.S. Patent    Nov. 30, 1999    5,993,670

APPARATUS FOR ADMIXING OF A FLOCCULANT LIQUID TO A SLUDGE STREAM AND USE OF THE APPARATUS

DESCRIPTION

The invention relates to an apparatus for admixing flocculant liquid to a wastewater or sewage sludge stream, in which a distribution head, which is rotated by a drive, is arranged in a sludge pipe, through which a wastewater or sewage sludge flows, and is associated with a rotational plane, and the distribution head has, along a circumference thereof, which surrounds a rotational axis, distributed flocculant outlets and mixing blades, and is connected with a flocculant liquid delivery conduit.

The invention also relates to the use of the apparatus of admixing the flocculant liquid, which is formed by a mixture of an active agent and water and of which n parts are added to 100 parts of the wastewater or sewage sludge, with the flocculant liquid added to the 100 parts of the sludge containing a necessary amount a of the active agent.

There exist cases, when an apparatus for admixing is located, in the direction of the sludge flow, downstream of a delivery pump or a centrifuge and which mixes a flocculant liquid and the wastewater with each other with good results. However, there exists a noticeable number of cases when this is not the case and when the admixing apparatus fails to effect a satisfactory mixing of the flocculant liquid and the sludge. In a known apparatus of the above-mentioned type (DE-05 40 29 824), the flocculant outlets are formed as holes or nozzles, and each mixing blade is formed as a journal-like projection, with the dimensions of the mixing blade and the outlet in a direction transverse to the rotational plane being very small in comparison with the width of the sludge stream. The admixture of the flocculant liquid to the sludge, which is obtained with this apparatus is insufficient, i.e., the added flocculant liquid is not sufficiently uniformly distributed in the sludge stream behind the apparatus and is not contained in the sludge in the quantity necessary for a satisfactory flocculation.

Therefore, an object of the invention is an apparatus of the above-described type with which a better admixing of the flocculant liquid to the wastewater or sewage sludge is achieved. The apparatus according to the invention, which achieves this object, is characterized in that the flocculant outlets are formed as slots and the mixing blades are formed as strips, which extend transverse to the rotational plane and have a length equal at least a half of the width of the sludge stream.

The construction of the distribution head of the inventive apparatus permits to achieve an improved admixture and distribution of the flocculant liquid in the sludge. The flocculant liquid exits from every slot in a form of a broad strip into which a following mixing blade is inserted in a direction opposite to the rotational direction and which pulls the flocculant liquid along its edge as a foggy strip through the sludge. The flocculant liquid is delivered through the slots as an interrupted torrent into the sludge, and the slots and strips are arranged one after another in the rotational direction. The dimensioning of the length of the slots and the blades is effected in accordance with the diameter of the stream or of the distribution head.

According to the invention, the flocculant slots and the strip-shaped blades can extend both in the direction of the sludge stream and substantially perpendicular to the sludge stream. An another embodiment of the invention is possible in which the rotational axis of the mixing head extends at an angle to the sludge stream. As a rule, however, the rotational plane of the mixing head extends substantially in the direction of the sludge stream.

Each slot is formed, e.g., of two or more slot sections arranged in a row. It is, however, particularly effective and advantageous when each slot is continuous along its entire length. This prevents clogging and an undesirable high exit velocity of the flocculant liquid.

Each strip-shaped mixing blade is divided, e.g., along its length, with radial incisions in a comb-like fashion. However, if is particularly effective and advantageous when each strip-shaped mixing blade is continuous over its length. This improves the rigidity of the strip-shaped mixing blades and improves the mixing action.

The cross-section of each outlet slot can be changed along its length for controlling the amount of the emerging flocculant liquid. It is particular effective and advantageous when the cross-section of each outlet slot is increased, when viewed along its length, toward the middle. This shape of the outlet slots is used when the slots extend transverse to the stream direction, as in the middle of the sludge pipe, there is more sludge than at the sides. With a uniform slot width, a uniform delivery of the flocculant into the sludge is achieved.

The slots, which form an outlet for the flocculant liquid, have, e.g., a width of 7–9 mm. The greater is the amount of the flocculant liquid to be delivered in a unit of time, the wider the slots are, and the smaller is the amount of the flocculant liquid to be delivered in a unit of time, the narrower they are.

It is particularly effective and advantageous when the edge of each strip-shaped mixing blade extend approximately parallel to the inner contour of the sludge pipe, forming a clearance therebetween. The elongate strip-shaped mixing blades extending in a radial direction improve the admixing action. However, a clearance should remain between the mixing blade and the sludge pipe, with the clearance being sufficiently large to permit passing of stone pieces present in the sludge.

This clearance is particularly important and is large when the strip-shaped mixing blades extend transverse to the stream. When the strip-shaped mixing blades extend transverse to the stream, the clearance preferably is smaller in the direction of the rotational axis than in the direction transverse to the rotational axis.

A particularly effective and advantageous embodiment of the invention is obtained, when the direction of rotation of the distribution head drive can be changed. In the apparatus according to the invention, the mixing blade is relatively large or protrudes with respect to the sludge pipe cross-section, so that a danger of clogging with hard pieces and of accumulation of fibers or threads exists if the distribution head rotates in the same direction for a long time. The rotation in opposite directions prevents such clogging and accumulation.

Two flocculant outlets can be provided, e.g., between two mixing blades. However, it is particularly effective and advantageous when outlet slots and strip-shaped mixing blades alternate in the rotational direction. This also improves the admixing process. Over the distribution head, in the rotational direction, there are provided two or more outlet slots and two or more strip-shaped mixing blades.

It is further particularly effective and advantageous when the inner cross-section of the sludge pipe, in the region of the distribution head, is similar to the further inner cross-section of the sludge pipe. The apparatus according to the invention thus eliminates the narrowing of the sludge pipe and an associated with it increase of the flow velocity of the sludge. The distribution head already forms a greater narrowing of the cross-section available for the sludge.

It is particularly effective and advantageous when the distribution head is formed as a cylindrical tubular section and/or when the outer diameter of the distribution head is equal at least to 0.4 of the inner diameter of the sludge pipe. This simplifies the construction and improves the rigidity of the distribution head, with the shape of the outlet slots and the strip-shaped mixing blades presenting an increased demand to the rigidity of the distribution head.

A particularly effective and advantageous embodiment of the invention is formed when the distribution head passes into a rotatably supported connection tube which extends away from the sludge pipe and which is connected to the drive and with a flocculant liquid delivery conduit, and is further provided with inlet openings and is rotably supported in a connection chamber into which the flocculant liquid delivery conduit opens. This manner of delivery of the flocculant liquid to a rotatable distribution head permits to insure an increased rigidity of the connection tube and its support with simple means. This becomes possible in the apparatus according to the present invention due to the "stone crushing" cooperation of the strip-shaped mixing blades and the sludge pipe.

For a satisfactory delivery of the flocculant liquid through the outlet slots, the flow cross-section, which is available for the flocculant liquid, is very important. In one embodiment of the invention, all of the outlet slots together have a cross-section which is smaller than the preceding flow cross-section of the flocculant liquid. The entire cross-section of the inlet opening is not smaller than the flow cross-section in the delivery conduit and in the connection tube. The flow cross-section in the distribution head and in the connection tube are similar. The arrangement of the connection tube in a sealed connection chamber enables to optimize the flow cross-section of the flocculant liquid.

It is particularly effective and advantageous when a check valve is arranged in the flocculant liquid delivery conduit when the flocculant liquid in front of the check valve is not under pressure, e.g., when the flocculant liquid pump does not operate, the sludge can penetrate into the outlet slots. The sealings and the bearings in the connection chamber remain lubricated with the flocculant liquid when the flocculant liquid from the flocculant liquid pump is not under pressure any more.

A particular effective and advantageous embodiment of the invention is obtained when the distribution head is driven with a rotational speed of 700–2,500 revolution/min preferably, 1,000–2,000 revolution/min. At this relatively high rotational speed, a desired improved admixing and distribution of the flocculant liquid in the sludge takes place. At the too low rotational speed, below 500 revolution/min, the strip or the stream of the flocculant liquid break off. However, a big speed requires too high expenses in order to achieve the desired effect. In a known apparatus (DE-05 4029824) of the above-described type, the flocculant is available which is stored in a reservoir. It is further known (DE-05 39 01 292) to add fresh water to a flocculant available in a liquid or powder form to obtain about 1% of a flocculant parent solution. The flocculant parent solution is then mixed, at a filling station in a manner known the field of wastewater treatment, with 4–10 volume parts of make-up water to obtain a flocculant in a form of a so-called commercial solution. This flocculant is added in the amount of 18–20% of the amount of the sludge is added to the sludge, i.e., about 20 parts of the flocculant liquid in a form of flocculant agent is added to 100 parts of sludge. At that, the flocculant—containing sludge, i.e., the conditioned sludge, contains ⅙ of liquid added by admixing of the additionally added flocculant liquid.

In a known application, for the additional processing of the flocculant agent a large amount of water is used, which is expensive. For processing, in addition to the apparatus for obtaining the parent solution, an apparatus for obtaining the commercial solution is needed, which results in additional expenses associated with the apparatus and in additional expenses associated with the driving of the apparatus. The flocculant and its water are delivered until they mix up with the sludge, and the delivery require energy, which is costly. The water component of the flocculant must be delivered, together with the sludge, to filter presses, pass through the filter presses and, finally, purified again. Thus, in a known application, additional increased expenses are associated with the water contained in the flocculant liquid.

Therefore, an object of the invention is to so improve the process described above that the expenses associated with the use of the flocculant liquid or increase of its water content, are eliminated. This object is achieved according to the invention by so designing the above-described apparatus according to the invention that maximum 3t of the flocculant liquid need be provided for 100t of sludge.

It was found out, that the use of the distribution head of the apparatus according to the invention permits to eliminate the water component of the flocculant liquid without the elimination of the effectiveness of the flocculant liquid admixed to the sludge. Whereas in the know application in order to achieve a predetermined effect with a predetermined amount of the additive, a large amount of the water component is necessary, this is not necessary when the inventive apparatus is used. The water component of the flocculant liquid can be reduced to a very large extent, so that the expenses associated with this water content are correspondingly eliminated. As less water is necessary, less water need be pumped, and less water need be purified.

The improved effectiveness achieved by the invention can be explained, without claiming that the explanation is correct, as follows: The particular shape of the mixing blade of the inventive apparatus breaks the sludge particles of the wastewater or sewage sludge to a great extent, and the resulting broken pieces form open fissures. The particular shape of the flocculant outlets insures that the flocculant liquid takes a shape of a large surface veil which cover the freshly opened fissures so that the mixing of the sludge and the flocculant intensifies. The flocculant liquid in accordance with the invention is already admixed in a finely distributed state so that it is not necessary the additive to further dilute in a large amount of water, i.e., to increase the water component of the flocculant liquid. Up to the present, as a rule, a 1% flocculant parent solution was used, with 1 weight part of the flocculant additive being mixed with 100 weight parts of water. The invention also permits the use of 1% flocculant parent solution. Thus, according to a particular effective and advantageous embodiment of the invention, the flocculant liquid is used as a parent solution, with the additive being mixed with water in a single step. With this embodiment, additional stations for further mixing with water are eliminated. With this embodiment, preferably maximum 1 part of a flocculant liquid is provided for 100 parts of sludge. The water component is reduced to an amount of water only necessary for the dilution of the addive. Here, part (P) designate a volume part.

Figure 2:
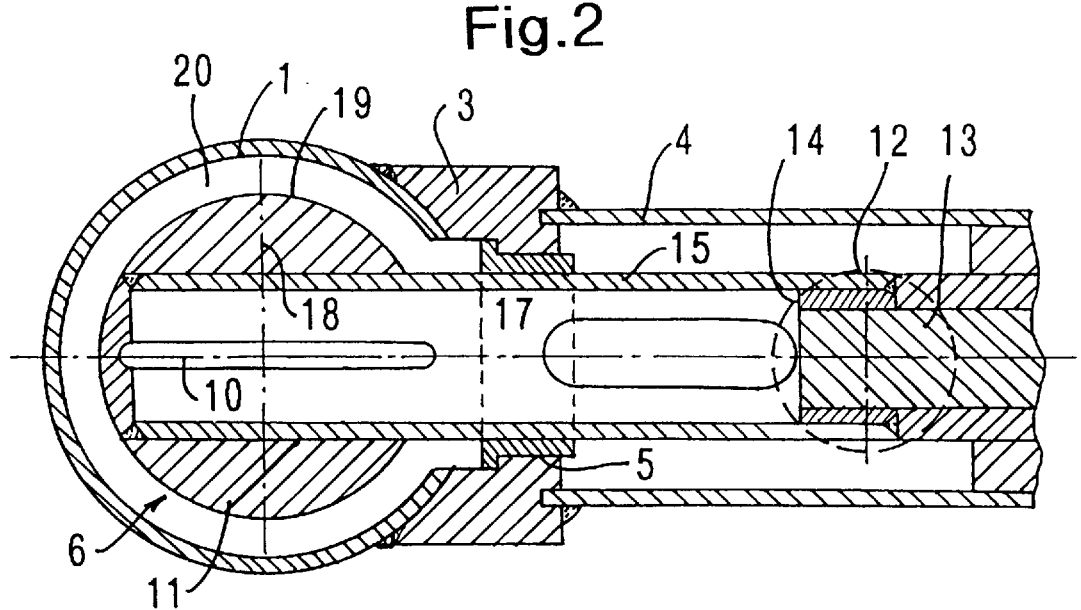

A preferred embodiment of the invention is shown in the drawings wherein:

FIG. 1 shows a schematic plan view, with a cut-out, of an apparatus for admixing a flocculant liquid to a sludge stream; and FIG. 2 shows a cross-sectional view along line II—II in FIG. 1 at a scale greater than that of FIG. 1.

The apparatus, which is shown in the drawings, is mounted on a sludge pipe 1 through which a wastewater or sewage sludge flows in a direction of arrow 2. The apparatus is mounted on the sludge pipe 1 by means of an elongate flange 3 and includes a connection chamber 4 projecting from the flange 3. From the connection chamber 4, a distribution head 6 extends into the sludge pipe 1 and is rotated by a drive 7 provided at the opposite end of the chamber 4 and formed as an electromotor. A flocculant liquid conduit 8 opens into the chamber 4, and a check valve 9 is located in the conduit 8. The distribution head 6 forms outlet slots 10 and carries mixing strip shaped blades (11).

A sleeve 14 supports a connection tube 15 in a shaft extension 12 which extends from the drive 7, and in the end wall of the connection chamber 4, there is provided an axial face seal 16 through which the shaft extension 13 extends. The connection tube 15 has a plurality of elongate entrance openings 17 through which flocculant flows into the connection tube from the connection chamber. The connection tube 15 projects into connection chamber 4 through a plain bearing sleeve 5 provided in the flange 3, with the tubular-shaped distribution head 6 forming an integral part of the tube 15. The distribution head 6 is associated with a rotational plane 18 designated with a dash line. Each mixing blade 11 forms an arcuate edge 19 which, in a corresponding position of the blade, limits a slot 20 with respect to the sludge pipe 1, which has a circular cross-section.

I claim:

1. An apparatus for admixing a flocculant liquid to a sludge stream,
    wherein a distribution head (6), which is rotated by a drive, is arranged in a sludge pipe (1), through which a wastewater or sewage sludge flows, and is associated with a rotational plane, and
    wherein the distribution head has, along a circumference thereof, which surrounds a rotational axis, distributed flocculant outlets and mixing blades, and is connected with a flocculant liquid delivery conduit,
    characterized in that the flocculant outlets (10) are formed as slots and the mixing blades (11) are formed as strips extending transverse to the rotational plane (18) and having a length equal at least half of an inner diameter of the sludge pipe (1).

2. An apparatus according to claim 1, characterized in that each outlet slot (10) is continuous along its length.

3. An apparatus according to claim 1 characterized in that each strip-shaped blade (11) is continuous along its length.

4. An apparatus according to claim 1, characterized in that a cross-section of each outlet slot (10) when viewed along its length, increases toward a middle thereof.

5. An apparatus according to claim 1, characterized in that an edge (19) of each mixing strip-shaped blade (11) forms with an inner contour of the sludge pipe(1) a slot (20) and extends approximately parallel to the inner contour.

6. An apparatus according to claim 1, characterized in that a rotational direction of the distribution head (6) drive (7) can be changed.

7. An apparatus according to claim 1, characterized in that respective outlet slots (10) and strip-shaped mixing blades (11), when viewed in a rotational direction, alternate.

8. An apparatus according to claim 1, characterized in that the inner cross-section of the sludge pipe (1), in the region of the distribution head (6), is the same as a nominal cross-section of the distribution head(6).

9. An apparatus according to claim 1 characterized in that the distribution head (6) is formed as a cylindrical tubular section.

10. An apparatus according to claim 1, characterized in that the outer diameter of the distribution head (6) is equal to at least 0.4 of the inner diameter of the sludge pipe (1).

11. Apparatus according to claim 1, wherein the distribution head passes into a rotatable connection tube, which extends away from the sludge pipe and is connected to the drive, and to which a flocculant liquid delivery conduit is connected, characterized in that the connection tube (15) is provided with inlet openings (17) and is rotatably supported in a connection chamber (4) into which the flocculant liquid delivery conduit (8) opens.

12. An apparatus according to any of the preceding claims, characterized in that a check valve (9) is arranged in the flocculant liquid delivery conduit.

13. An apparatus according to claim 1, characterized in that the distribution head (6) is driven with a rotational speed of 700–2,500 revolution per min.

14. An apparatus according to claim 13, characterized in that the distribution head is driven with a rotational speed of 1,000–2,000 revolution per min.

15. A method of admixing a flocculent liquid to a sludge stream, comprising the steps of:
    providing an admixing apparatus including a distribution head, which is rotated by a drive, is arranged in a sludge pipe, through which a wastewater or sewage sludge flows, and is associated with a rotational plane, the distribution head having, along a circumference thereof, which surrounds a rotational axis, distributed flocculent outlets and mixing blades, and is connected with a flocculent liquid delivery conduit, with the flocculent outlets being formed as slots and the mixing blades being formed as strips extending transverse to the rotational plane and having a length equal to at least half of a diameter of the sludge pipe;
    forming the flocculent liquid by mixing an active ingredient with water, with the flocculent liquid containing such amount of the active ingredient that when the flocculent liquid is added to 100 parts of wastewater sludge, maximum 3 parts of the active ingredient is added to 100 parts of the sludge; and
    delivering the flocculent liquid to the distribution head for admixing the flocculent liquid to the sludge stream flowing through the sludge pipe.

16. A method according to claim 15, wherein the admixing apparatus providing step includes providing a distribution head in which each outlet slot and each strip-shaped blade are continuous along their respective lengths, and in which a cross-section of each outlet slot, when viewed along its length, increases toward a middle of the slot.

17. A method according to claim 15, wherein the admixing apparatus providing step includes providing a distribution head in which an edge of each mixing strip-shaped blade extends approximately parallel to an inner contour of the sludge pipe and forms with an inner contour of the sludge pipe a slot.

18. A method according to claim 15, wherein the admixing apparatus providing step includes providing a distribution head drive, a rotational direction of which can be changed.

19. A method according to claim 15, wherein the admixing apparatus providing step includes providing a distribution head with alternating, when viewed in the rotation direction, slots and strip-shaped blades.

20. A method according to claim 15, wherein the admixing apparatus providing step includes providing an admixing apparatus in which the distribution head is formed as a cylindrical tubular section, and the sludge pipe has an inner cross-section in a region of the distribution head which correspond to a nominal cross-section of the distribution head.

21. A method according to claim 15, wherein the admixing apparatus providing step includes providing an admixing apparatus in which an outer diameter of the distribution head is equal to at least 0.4 of an inner diameter of the sludge pipe.

22. A method according to claim 15, wherein the admixing apparatus providing step includes providing an admixing apparatus in which the distribution head passes into a rotatable connection tube, which extends away from the sludge pipe and is connected to the drive of the distribution head, and to which the flocculent liquid delivery conduit is connected, to the drive of the distribution head, and to which the flocculent liquid delivery conduit is connected, the connection tube being provided with inlet openings and being rotatably supported in a connection chamber into which the flocculent liquid delivery conduit opens.

* * * * *